(12) United States Patent
Dorum

(10) Patent No.: US 9,978,161 B2
(45) Date of Patent: May 22, 2018

(54) SUPPORTING A CREATION OF A REPRESENTATION OF ROAD GEOMETRY

(71) Applicant: HERE Global B.V., Eindhoven (NL)

(72) Inventor: Ole Henry Dorum, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days. days.

(21) Appl. No.: 15/095,444

(22) Filed: Apr. 11, 2016

(65) Prior Publication Data

US 2017/0294036 A1 Oct. 12, 2017

(51) Int. Cl.
*G06T 11/20* (2006.01)

(52) U.S. Cl.
CPC .................. *G06T 11/203* (2013.01)

(58) Field of Classification Search
None
See application file for complete search history.

(56) References Cited

U.S. PATENT DOCUMENTS

| | | | |
|---|---|---|---|
| 5,717,847 A * | 2/1998 | Schulmeiss | G06T 11/203 345/442 |
| 6,029,173 A | 2/2000 | Meek et al. | |
| 6,304,818 B1 | 10/2001 | Kamiya | |
| 6,920,390 B2 * | 7/2005 | Mallet | G08G 5/065 340/988 |
| 7,002,578 B1 * | 2/2006 | Ritter | G01C 21/3638 345/419 |
| 7,038,682 B2 * | 5/2006 | Ananya | G06T 11/203 345/441 |
| 7,324,895 B2 | 1/2008 | Nagel | |
| 8,566,021 B2 | 10/2013 | Smarth | |
| 9,275,498 B2 * | 3/2016 | Ceylan | G06T 17/20 |
| 2001/0012981 A1 * | 8/2001 | Yamashita | G01C 21/3626 701/410 |
| 2009/0138188 A1 | 5/2009 | Kores et al. | |
| 2009/0138497 A1 | 5/2009 | Zavoli et al. | |

(Continued)

FOREIGN PATENT DOCUMENTS

| | | |
|---|---|---|
| EP | 1857780 A2 | 11/2007 |
| WO | 2000/063842 A1 | 10/2000 |

(Continued)

OTHER PUBLICATIONS

Biagioni et al., "Inferring Road Maps from Global Positioning System Traces: Survey and Comparative Evaluation", 91st annual meeting of the transporation reasearch board, 2013, p. 1-21.

(Continued)

*Primary Examiner* — Barry Drennan
*Assistant Examiner* — Jason Pringle-Parker
(74) *Attorney, Agent, or Firm* — Alston & Bird LLP

(57) ABSTRACT

A system including at least one apparatus creates a representation of a road geometry from a plurality of sets of data, each set of data including at least an indication of a position and an indication of a heading of a mobile object. The system detects an intersection in the representation of the road geometry. The system defines at least one Bézier curve representing a trajectory between an entry to and an exit from the intersection. The system replaces at least a part of the created representation of the road geometry for the intersection by the at least one defined Bézier curve.

17 Claims, 8 Drawing Sheets

(56) References Cited

U.S. PATENT DOCUMENTS

| | | | |
|---|---|---|---|
| 2012/0004845 A1 | 1/2012 | Kmiecik et al. | |
| 2013/0245435 A1* | 9/2013 | Schnaars | A61B 6/03 |
| | | | 600/425 |
| 2013/0328863 A1 | 12/2013 | Pirwani | |
| 2014/0249716 A1 | 9/2014 | Dorum et al. | |
| 2014/0249748 A1* | 9/2014 | Strassenburg-Kleciak | G01C 21/3658 |
| | | | 701/437 |
| 2016/0358349 A1 | 12/2016 | Dorum | |

FOREIGN PATENT DOCUMENTS

| | | |
|---|---|---|
| WO | 2009/059766 A1 | 5/2009 |
| WO | 2014/080023 A1 | 5/2014 |

OTHER PUBLICATIONS

Jin et al., "Road Feature Extraction from High Resolution Aerial Images Upon Rural Regions Based on Multi-Resolution Image Analysis and Gabor Filters", Remote sensing—advanced techniques and platforms—intechopen, Jun. 13, 2012, pp. 388-414.

"1-95 Vehicle Probe Project & National Performance Measures Research Data Set Description", i95coalition, Retrieved on Oct. 20, 2016, Website available: http://i95coalition.org/wp-content/uploads/2015/03/I95_Fact_Sheet_V11.pdf?dd650d.

U.S. Appl. No. 14/622,026, "Method and Apparatus for Generating Map Geometry Based on a Received Image and Probe Data", filed on Feb. 13, 2015, 38 pages.

Cao et al., "From GPS Traces to a Routable Road Map", Proceedings of the 17th ACM SIGSPATIAL International Conference on Advances in Geographic Information Systems, Nov. 4-6, 2009, pp. 3-12.

Schroedl et al., "Mining GPS Traces for Map Refinement", Data Mining and Knowledge Discovery, vol. 9, No. 1, Jul. 2004, pp. 59-87.

Pylvanainen et al., "3D City Modeling from Street-Level Data for Augmented Reality Applications"; Second International conference on 3D Imaging, Modeling, Processing, Visualization and Transmission, Oct. 13-15, 2012, 8 pages.

Hasberg et al., "Integrating Spline Curves in Road Constraint Object Tracking", Proceedings of the 11th International IEEE Conference on Intelligent Transportation Systems, 2008, pp. 1009-1014.

Zhang et al., "Integration of GPS Traces with Road Map", Proceedings of the Second International Workshop on Computational Transportation Science, Nov. 2-5, 2010, 6 pages.

Jo et al., "Generation of a Precise Roadway Map for Autonomous Cars", IEEE Transactions on Intelligent Transportation Systems, Jun. 2014, pp. 925-937.

\* cited by examiner

—— Polyline
- -> Offset vector
——> Median heading vector
·····> Mean shift vector
•   Constrained weighted center of mass
+   Seed point
—   Probe point

SUPPORTING A CREATION OF A REPRESENTATION OF ROAD GEOMETRY

FIELD OF THE DISCLOSURE

The invention relates to the field of creation of a representation of road geometry from data relating to mobile objects.

BACKGROUND

A representation of road geometry may be utilized, for instance, as a basis for mapping and navigation purposes.

A representation of road geometry for a selected geographic region may be defined automatically, for example, based on indications of a plurality of positions of mobile objects. The positions may be tracked while the mobile objects are moving around in the selected geographic region. If a heading of the respective mobile object is indicated as well for each indicated position, it may be possible to create a representation of a bi-directional road geometry. The representation of road geometry may be created for instance at a separate entity, which receives, collects and processes the indications of positions of a plurality of mobile objects.

A mobile object coming into consideration may be a mobile object that is configured to determine its position and associated heading based on internal measurements and to communicate determined positions and headings to an entity creating the representation of the road geometry. Such a mobile object could be a handheld device, for instance a smart phone or a tablet computer, which comprises a global navigation satellite system receiver and which uses received satellite signals for determining and tracking its own position and heading. The mobile object could be carried along by a user when using a vehicle that is moving around in the selected geographic region. Alternatively, such a vehicle could be considered to be the mobile object in this case.

Another mobile object coming into consideration may be for instance a navigation system that is integrated into a vehicle. It may be configured to determine its positions and associated headings based on received satellite signals and based on sensor data provided by the vehicle, while the vehicle is moving around in the selected geographic region. The navigation system may further be configured to communicate its positions and headings to an entity creating the representation of the road geometry using an integrated wireless communication interface, or via a separate communication system that is equally integrated into the vehicle, or via an external communication device, like a smartphone. Alternatively, the vehicle or a separate or external communication device could be considered to be the mobile object in this case.

SUMMARY OF SOME EMBODIMENTS OF THE INVENTION

A method is presented, which comprises creating a representation of a road geometry from a plurality of sets of data, each set of data including at least an indication of a position and an indication of a heading of a mobile object. The method further comprises detecting an intersection in the representation of the road geometry. The method further comprises defining at least one Bézier curve representing a trajectory between an entry to and an exit from the intersection. The method further comprises replacing at least a part of the created representation of the road geometry for the intersection by the at least one defined Bézier curve. The actions of the method may be performed by a single apparatus or in a distributed manner by a plurality of apparatuses.

Moreover, a first apparatus is presented, which comprises means for performing the actions of any one embodiment of the presented method.

Moreover, a system is presented, which comprises means for performing the actions of any one embodiment of the presented method. In such a system, the means may optionally be distributed to several apparatuses.

The means of the presented apparatus or the presented system can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The presented apparatus and the presented system may comprise a single means for all functions, a common plurality of means for all functions, or a plurality of different means for different functions.

Moreover, a second apparatus is presented, which comprises at least one processor and at least one memory including computer program code, the at least one memory and the computer program code with the at least one processor configured to cause the apparatus at least to perform the actions of any one embodiment of the presented method.

Moreover, a system is presented, which comprises at least one processor and at least one memory including computer program code, the at least one memory and the computer program code configured to, with the at least one processor, cause the system at least to perform the actions of any one embodiment of the presented method.

Moreover, a non-transitory computer readable storage medium is presented, in which computer program code is stored. The computer program code causes at least one apparatus to perform the actions of any one embodiment of the presented method when executed by a processor. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that also the computer program code by itself has to be considered an embodiment of the invention.

Any of the presented apparatuses and systems may comprise only the indicated components or one or more additional components.

In one embodiment, the presented method is an information providing method, and the presented first apparatus is an information providing apparatus. In one embodiment, the means of the presented first apparatus are processing means.

In certain embodiments of the presented methods, the methods are methods for supporting the creation of road geometry. In certain embodiments of the presented apparatuses, the apparatuses are apparatuses for supporting the creation of road geometry.

It is to be understood that any feature presented for a particular exemplary embodiment may also be used in an analog manner in combination with any other described exemplary embodiment of any category.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
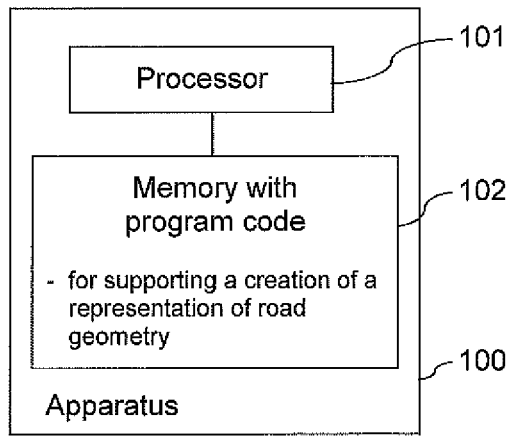
FIG. 1 is a schematic block diagram of an example embodiment of an apparatus.

FIG. 1 is a schematic block diagram of an example embodiment of any apparatus according to the invention. Apparatus 100 comprises a processor 101 and, linked to processor 101, a memory 102. Memory 102 stores computer program code for supporting a creation of a representation of road geometry. Processor 101 is configured to execute computer program code stored in memory 102 in order to cause an apparatus to perform desired actions. Memory 102 is thus an example embodiment of a non-transitory computer readable storage medium, in which computer program code according to the invention is stored.

Apparatus 100 could be a server or any other kind of mobile or stationary device. Apparatus 100 could equally be a component, like a chip, circuitry on a chip or a plug-in board, for any mobile or stationary device. Optionally, apparatus 100 could comprise various other components, like a data interface configured to enable an exchange of data with separate devices, a user interface like a touchscreen, a further memory, a further processor, etc.

An operation of an apparatus will now be described with reference to the flow chart of FIG. 2. The operation is an example embodiment of a method according to the invention. Processor 101 and the program code stored in memory 102 cause an apparatus to perform the operation when the program code is retrieved from memory 102 and executed by processor 101. The apparatus that is caused to perform the operation can be apparatus 100 or some other apparatus, for example but not necessarily a device comprising apparatus 100.

The apparatus creates a representation of road geometry from a plurality of sets of data. Each set of data includes at least an indication of a position and an indication of a heading of one of a plurality of mobile objects. (action 201) The indication of a position and of a heading may be based for example on signals and/or sensor data captured at the mobile object and/or at a device moving along with the mobile object. The heading of a mobile object is the direction of movement of the object, in particular of a movement on a road. The content of a set of data will also be referred to as probe.

The apparatus moreover detects an intersection in the representation of the road geometry. (action 202) It is to be understood that an intersection may be a junction of any number of roads in a limited area.

The apparatus moreover defines at least one Bézier curve representing a trajectory between an entry to and an exit from the intersection. (action 203)

The apparatus moreover replaces a part of the created representation of the road geometry for the intersection by the at least one defined Bézier curve (action 204)

Information on positions and headings collected by devices moving along roads may enable a creation of a representation of a road geometry. The invention is based on the consideration that creating a proper representation of an intersection turn maneuver geometry as a part of the road geometry may be challenging, though, if indicated positions and/or headings are noisy, if indicated headings of positions in the area of an intersection overlap, if there is a sparse coverage and/or if there are large sampling intervals.

Certain embodiments of the invention therefore provide that intersections, which may be detected in a representation of a road geometry, are modeled by means of Bézier curves. A respective Bézier curve may be created between pairs of entries to and exits from the intersection. Once created, the Bézier curves for each intersection may replace the original representation of the intersection in the representation of the road geometry entirely or in part.

Certain embodiments of the invention may have the effect that they may allow creating realistic turn maneuver geometries even when the density of indicated positions is sparse and the probes are noisy. Certain embodiments of the invention may have the effect that they may allow repairing defects, such as gaps, incorrect connections, or poor geometry shape in the original road geometry determined from probes. Certain embodiments of the invention may have the effect that a refined representation of intersection road geometry may be created automatically from a created representation of road geometry. Certain embodiments of the invention may be applicable for creation of two-dimensional (2D) as well as three-dimensional (3D) map intersection road geometry.

Figure 2:
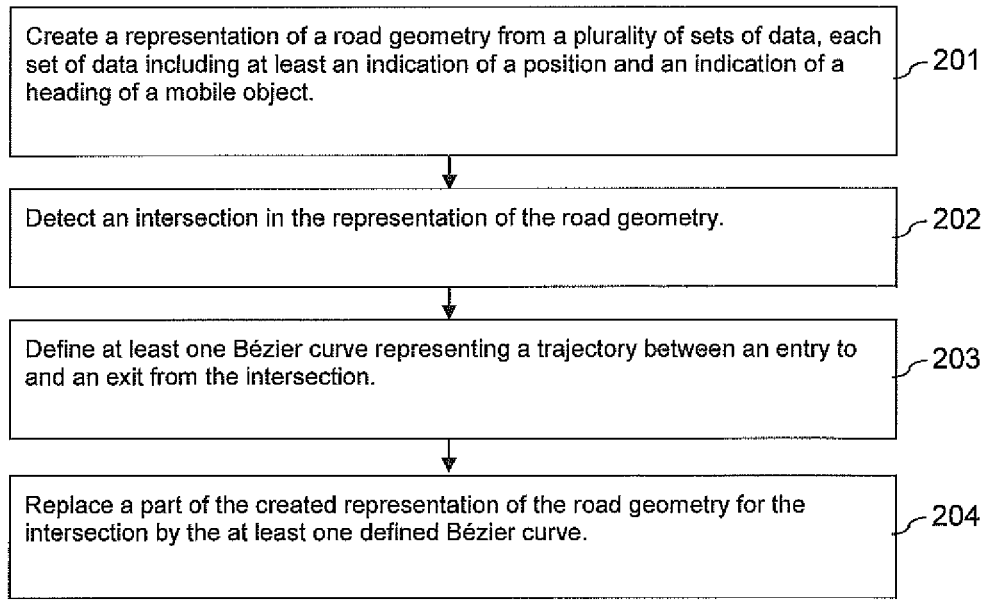
FIG. 2 is a flow chart illustrating an example operation in the apparatus of FIG. 1.

Apparatus 100 illustrated in FIG. 1 and the method illustrated in FIG. 2 may be implemented and refined in various ways.

In an example embodiment, a representation of the road geometry including the at least one Bézier curve is provided as a basis for road geometry based computations. It may be provided for instance for mapping computations. Alternatively or in addition, it may be provided for instance for navigation computations, for example though not exclusively in the scope of driver assistance computations, including advance driver assistance system (ADAS) computations. Alternatively or in addition, it may be provided for instance for computations that are performed for detecting changes in road geometry.

In an example embodiment, creating a representation of a road geometry may comprise creating a representation of a bi-directional road geometry, the representation of the bi-directional road geometry including separate curves for opposite directions of travel for at least some roads. Furthermore, detecting an intersection in the representation of the road geometry may comprise detecting intersections of curves and detecting end points of curves, creating an intersection node for each detected intersection of curves and each detected end point of a curve, clustering the intersection nodes to obtain at least one cluster of intersection nodes, and determining an intersection center for each cluster of intersection nodes. Furthermore, defining at least one Bézier curve representing a trajectory between an entry to and an exit from the intersection may comprise tracing a circle around a respective determined intersection center, wherein crossing points between curves of the bi-directional road geometry and the circle form at least one intersection entry gate as at least one entry to the intersection and at least one intersection exit gate as at least one exit from the intersection, and defining at least one Bézier curve connecting at least one possible pair of entry gate and exit gate. Furthermore, replacing a part of the created representation of the road geometry for the intersection by the at least one defined Bézier curve may comprise truncating, inside the circle, a curve of the representation of the bi-directional road geometry connected to the entry gate and a curve of the representation of the bi-directional road geometry connected to the exit gate of the at least one pair of entry gate and exit gate and adding the Bézier curve to the representation of the bi-directional road geometry.

Such an embodiment may also be described as a method comprising the following actions or as an apparatus configured to perform the following actions or as a system configured to perform the following actions or as a computer readable medium storing computer program code that is configured to cause an apparatus to perform the following actions when executed by a processor: Creating a representation of a bi-directional road geometry, the representation of the bi-directional road geometry including separate curves for opposite directions of travel for at least some roads; detecting intersections between curves and detecting end points of curves, creating an intersection node for each detected intersection and each detected end point, clustering the intersection nodes to obtain at least one cluster of intersection nodes, and determining an intersection center for each cluster of intersection nodes; tracing a circle around a respective determined intersection center, wherein crossing points between curves of the representation of the bi-directional road geometry and the circle form at least one intersection entry gate and at least one intersection exit gate, and defining at least one Bézier curve connecting at least one possible pair of entry gate and exit gate; truncating, inside the circle, a curve of the representation of the bi-directional road geometry connected to the entry gate and a curve of the representation of the bi-directional road geometry connected to the exit gate of the at least one pair of entry gate and exit gate; and adding the Bézier curve to the representation of the bi-directional road geometry.

Considering bi-directional road geometry may have the effect that it is possible to differentiate between different directions of travel on roads and also between bi-directional roads and one-way roads. It also allows differentiating between entries to and exits from an intersection. Differentiating between entries to and exits from an intersection may have the effect that the achievable representation of the intersection geometry may be particularly accurate. Considering not only crossings of curves but also end points of curves as intersection nodes and thus as potentially belonging to an intersection may have the effect that gaps in the available data may be closed.

A direction of travel derived from the information in the sets of data may be associated with each curve in the representation of a bi-directional road geometry. The direction of travel may thus indicate which curve enters an intersection and which curve exits an intersection, which facilitates a determination of entry gates and exit gates for each intersection. An intersection center for a cluster of intersection nodes may be determined in different ways, for instance using the mean or the median of the intersection nodes.

In an example embodiment clustering intersection nodes comprises: a) selecting an intersection node that has not been tagged as processed and tagging the intersection node as processed; b) searching for surrounding nodes that have not been tagged as processed within a search radius, tagging all found intersection nodes as processed and considering the selected intersection node and the found intersection nodes as belonging to a cluster; and c) continuing with action a) for further clusters until all intersection nodes have been tagged as processed. Such a clustering may have the effect that all nodes potentially relating to an intersection may be determined easily and reliably. The search radius may be fixed or variable.

In an example embodiment at least one of the at least one Bézier curve is defined by means of a cubic control polygon. Using a cubic Bézier curve may have the effect that a large variety of smooth forms may be achieved. In an example embodiment each of the at least one Bézier curve is defined by means of a cubic control polygon having a first edge, a second edge, a third edge and a fourth edge. The first edge extends between an intersection entry gate and an intersection exit gate. The second edge has a start point at the intersection entry gate and extends to an end point with an orientation corresponding to a direction of travel of a curve entering the circle at the intersection entry gate. The fourth edge has an end point at the intersection exit gate and reaches the end point from a start point with an orientation corresponding to a direction of travel of a curve exiting the circle at the intersection exit gate. A length of the second edge and a length of the fourth edge are scaled with a length of the first edge and a (fixed or adjustable) scaling factor. The third edge extends between the end point of the second edge and the start point of the fourth edge. Taking account of the orientation of curves entering the intersection and leaving the intersection may have the effect that the connections between entry and exit gates may be modeled in a particularly faithful manner.

A respective Bézier curve may be defined for example for each possible pair of entry gate and exit gate of an intersection. This may exclude the pair of entry gate and exit gate that may be assumed to belong to the same road.

In an example embodiment, a defined Bézier curve is validated based on the received sets of data. This may have the effect that defined Bézier curves that may not be suited to reflect the actual geographical situation may be identified and discarded. For example, if a Bézier curve has been determined based on intersections nodes corresponding to curve end points that belong to the end of a dead-end street rather than to an intersection with a gap in available data, the Bézier curve may not be considered valid as a result of the validation process. The same may apply for instance in case the Bézier curve defines a turn to the left, while turning left may be prohibited, etc.

In an example embodiment, validating a Bézier curve, which is defined to connect an intersection entry gate and an intersection exit gate, comprises determining a number of trajectories of mobile objects running from a geographic location corresponding with a predetermined accuracy to the intersection entry gate to a geographic location corresponding with a predetermined accuracy to the location of the intersection exit gate based on the received sets of data, with the length of the trajectories being proportional, within predetermined limits, to a length of the Bézier curve, and comparing the number with a predetermined threshold value. If the number exceeds the predetermined threshold value (and optionally, if the number is equal to the predetermined threshold value as well), the Bézier curve may be determined to be valid. This may have the effect that created Bézier curves may be validated based on data that was available anyhow for the creation of the original representation of road geometry. The trajectory of a mobile object may be required to be proportional to the length of the Bézier curve in that trajectory and Bézier curve may be defined using different scales. The trajectory of a mobile object may be represented for instance by a polyline. To determine the length of the trajectory of a mobile object corresponding to a turn maneuver for length comparison to the Bézier curve, the trajectory polyline length may be computed for example from where it enters and intersects the intersection at the entry gate to where it intersects and exits the intersection at the exit gate allowing intermediate trajectory points (e.g. due to a detour) to be outside the circle. Considering only trajectories having a length that is proportional to the length of the Bézier curve may have the effect that only trajectories without detours between the entry to an intersection at a particular entry gate and an exit of the intersection at a particular exit gate may be counted. Such detours may occur in the case of U-turns, or a circling of a block. Considering the number of trajectories of comparable length as the Bézier curve may have the effect that an assumed connection between a pair of entry and exit gates that does not correspond to any real connection may be detected, as it may be assumed that any real connection is used at least from time to time.

It is to be understood that due to measurement errors, etc., the considered trajectories of mobile objects running from a geographic location corresponding with a predetermined accuracy to the intersection entry gate to a geographic location corresponding with a predetermined accuracy to the location of the intersection exit gate based on the received sets of data will usually not traverse the entry and exit gate exactly. The predetermined accuracy may be defined in various ways. It may be required, for instance, that the trajectory of a mobile object passes an entry gate and an exit gate within a predetermined distance. In case the representation of the road geometry comprises polylines for representing road segments between intersections, it may be required alternatively, for instance, that at least one position of a trajectory indicated in a probe of a mobile object corresponds to the polyline of the incoming road segment making up at least a part of at least one curve in the representation of the road geometry and that at least a second position indicated in the trajectory of the mobile object corresponds to the polyline of the outgoing road segment making up at least a part of at least one curve in the representation of the road geometry, where an intersection of the circle traced around the intersection center with the polyline representing the incoming road segment corresponds to the entry gate and an intersection of the circle with the polyline representing the outgoing road segment corresponds to the exit gate. If the incoming or outgoing road segments are short, it may be required that the search is extended to road segments beyond the two entry and exit road segments connecting at the intersection. A probe position corresponding to the polyline of a road segment may be required for instance to essentially coincide with the polyline, or it may be required for instance to have been considered in the computation of the polyline. Furthermore, the predetermined limits, within which the length of a trajectory of a mobile object has to be proportional to the length of a Bézier curve, may be defined for instance as a predetermined absolute or relative value.

In an example embodiment, a part of at least one curve between an intersection entry gate and an intersection exit gate within the circle is truncated and a Bézier curve is added only, if the Bézier curve has been determined to be valid. This may have the effect that original curve sections may only be replaced by the Bézier curve, in case the Bézier curve can be expected to match the real road geometry.

Figure 3:
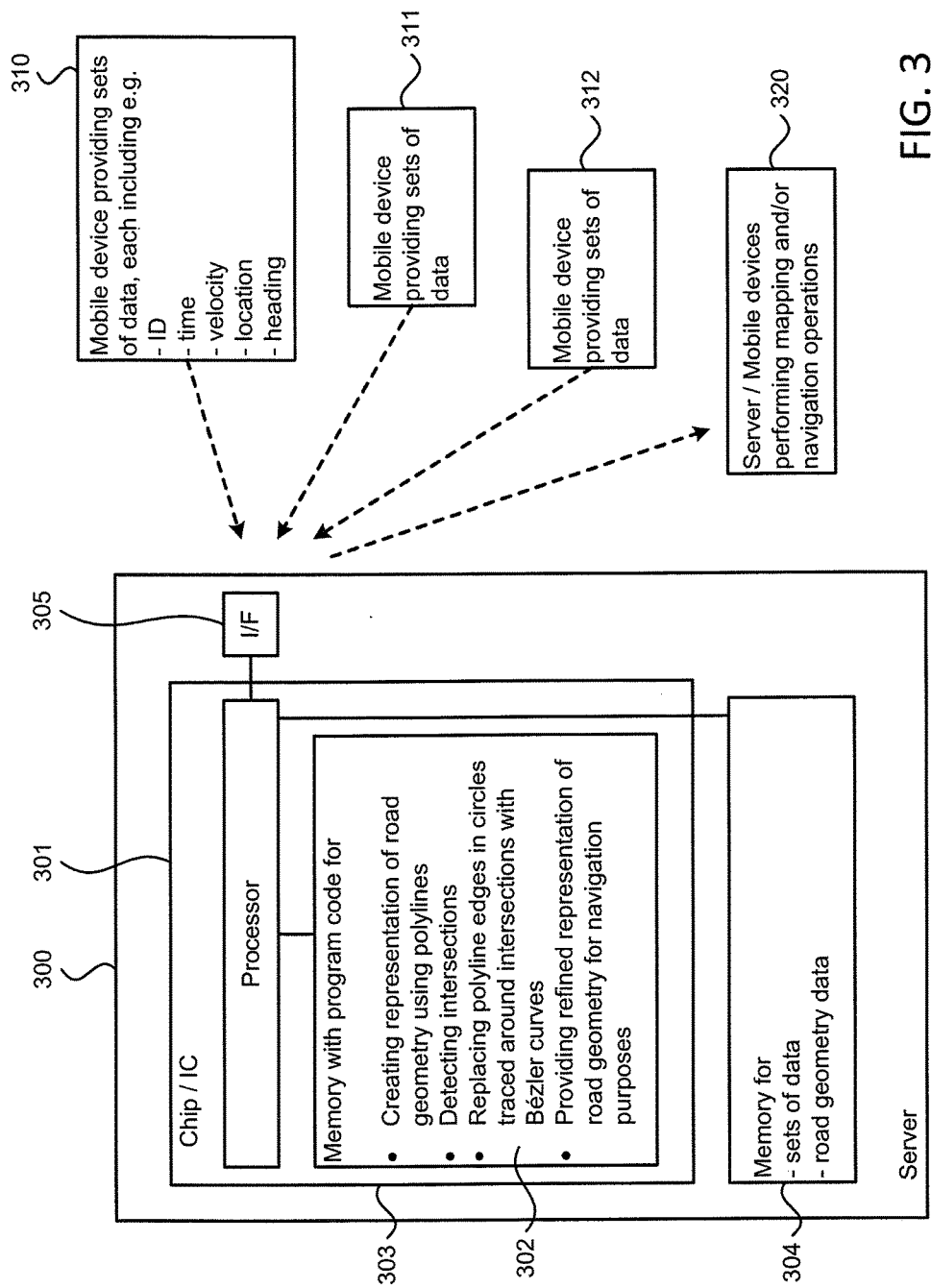
FIG. 3 is a schematic block diagram of an example embodiment of system.

FIG. 3 is a schematic block diagram of an example embodiment of a system according to the invention. The system supports the creation of a representation of road geometry.

The system comprises a server 300, a plurality of mobile devices 310, 311, 312 and one or more further devices 320.

Server 300 may be for instance a map server, a map generation server, a general location service server, or any other kind of server. Server 300 comprises a processor 301 that is linked to a first memory 302, to a second memory 304 and to a communication interface 307.

Processor 301 is configured to execute computer program code, including computer program code stored in memory 302, in order to cause server 300 to perform desired actions.

Memory 302 stores computer program code for creating a representation of road geometry based on received sets of data using polylines, computer program code for detecting intersections, computer program code for replacing polyline sections in circles traced around intersections with Bézier curves, and computer program code for providing a refined representation of road geometry for mapping or navigation purposes. The computer program code may comprise for example similar program code as memory 102. In addition, memory 302 could store computer program code configured to realize other functions, for instance program code for application making use of the generated road geometry data. In addition, memory 302 could also store other kind of data.

Processor 301 and memory 302 may optionally belong to a chip or an integrated circuit or a plug-in board 303, which may comprise in addition various other components, for instance a further processor or memory. It may comprise for instance a working memory for processor 301.

Memory 304 is configured to store data, for example, receives sets of data and road geometry data. Moreover, it may be configured to store any other kind of data.

Communication interface 305 may be for instance a data interface for a wired or for a wireless connection. Server 300 may be configured, for instance, to exchange data with mobile devices via the Internet. Alternatively, server 300 could be for instance a part of a cellular communication network, via which data may be received and/or transmitted. Server 300 may moreover be connected directly, via a local network, via the Internet or via any other communication network to at least one further server. It is to be understood that server 300 may comprise several types of communication interfaces in parallel.

Component 303 and server 300 could be example embodiments of an apparatus according to the invention.

Mobile devices 310-312 may be any kind of mobile devices which are able to provide an indication of time, position, velocity and heading along with an identifier of the mobile device as probe in a respective set of data. Mobile devices 310-312 may be configured for instance to provide the sets of data via the Internet to server 300. Mobile devices 310-312 may be configured to be able to access the Internet via a cellular communication network and/or via a wireless local area network or by a wired connection when located in the area of a local area network. Mobile devices 310-312 may be devices of the same kind or of different kinds. They may include for instance smartphones and/or navigation devices integrated into vehicles, etc. They may comprise or have access to a global navigation satellite system receiver and they may comprise or have access to measurement data of various sensors of a vehicle.

Device 320 may be another server, like a positioning assistance server, which is configured to receive road geometry data via any suitable communication network(s), to perform mapping and/or navigation operations based on received road geometry data and to provide results of such computations as assistance data to mobile devices via any suitable communication network(s). Alternatively, device 320 may be a mobile device configured to perform mapping and/or navigation operations based on received road geometry data in the scope of a user application.

It is to be understood that the presented example system may be varied in many ways by adding, omitting and/or modifying components. For example, functions of server 300 could be distributed to a plurality of servers instead. Such servers could be cooperating for instance among each other or operate under control of a central server. For example, memory 304 could be external to server 300. It could belong for instance to another server which enables server 300 to access memory 304. For example, functions of device 320 could be implemented in server 300 as well.

Example operations in the system of FIG. 3 will now be described with reference to FIGS. 4 to 14.

Figure 4:
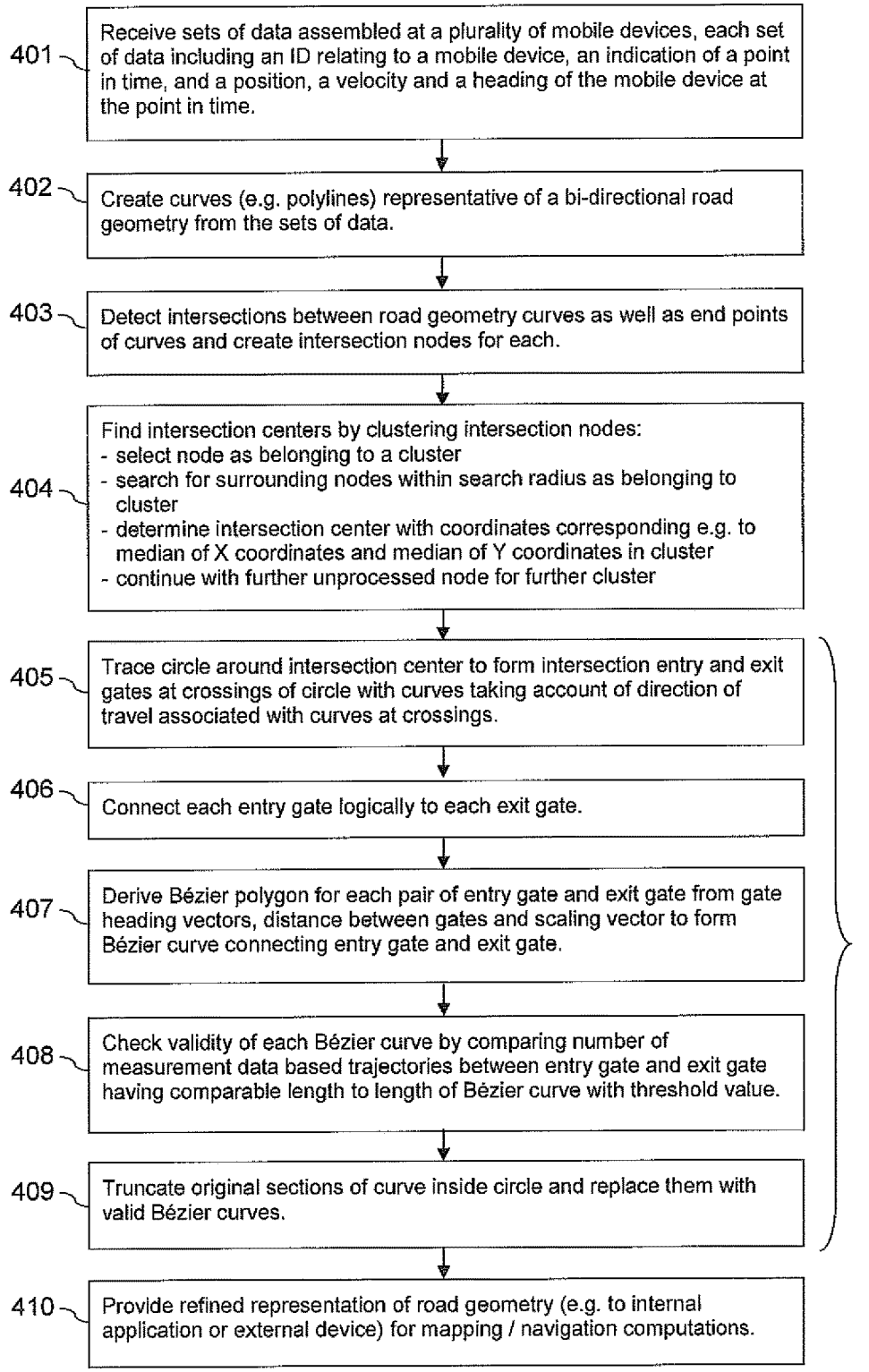
FIG. 4 is a flow chart illustrating example operations in the apparatus of FIG. 3.

FIG. 4 is a flow chart illustrating operations at server 300. Processor 301 and some of the program code stored in memory 302 cause server 300 to perform the presented operations when the program code is retrieved from memory 302 and executed by processor 301. FIGS. 5 to 14 are diagrams further illustrating individual operations presented in FIG. 4.

Each mobile device 310-312 receives and processes signals and/or sensor data that enable positioning computations. The signals may include signals from global navigation satellite system satellites, for example GPS satellites, but equally any other suitable kinds of signals, like signals of cellular base stations. The sensor data may include measurement results from various kinds of sensors, like a gyroscope and/or an accelerometer and/or a barometer. Based on the received signals and/or sensor data, and optionally based on additional positioning assistance data, mobile device 310-312 performs positioning computations at regular intervals. The positioning computations include a computation of the current time, the current position of mobile device 310-312, the current velocity of mobile device 310-312 and the current heading of mobile device 310-312. The latter two pieces of information may be obtained for example based on tracked time and position information. Mobile device 310-312 assembles this information along with an identifier as a respective set of data. The identifier may be an identifier identifying the mobile device, but it could equally be any other suitable identifier, for instance an identifier identifying a user using the device or an identifier identifying an application performing the computations.

The assembly of sets of data may be performed by mobile device 310-312, for instance, whenever a user has activated a corresponding application when the user plans to be moving by vehicle along the streets in a certain area, for instance in a particular city or region. Alternatively, in particularly when integrated into a vehicle, it could be started automatically, for instance whenever the device is powered-on. The vehicle used by the user could be for instance a car, a motorcycle or a bicycle.

Mobile device 310-312 transmits the assembled sets of data to server 300 via a cellular network and the Internet to server 300. Each set of data may be provided immediately when available, but sets of data may also be collected and transmitted to server 300 at regular longer intervals, or upon a user request before an application of mobile device 310-312 assembling the sets of data is being switched off, or automatically when an application of mobile device 310-312 assembling the sets of data is being switched off, or when access to a wired or wireless local area network is given.

The operations illustrated in FIG. 4 start with server 300 receiving sets of data that have been assembled by a plurality of mobile devices 310-312 based on measurements. (action 401) Each set of data includes an identifier (ID), an indication of a point in time, an indication of a position of the mobile device at the indicated point in time, an indication of a velocity of the mobile device at the indicated point in time, and an indication of a heading of the mobile device at the indicated point in time.

Figure 5:
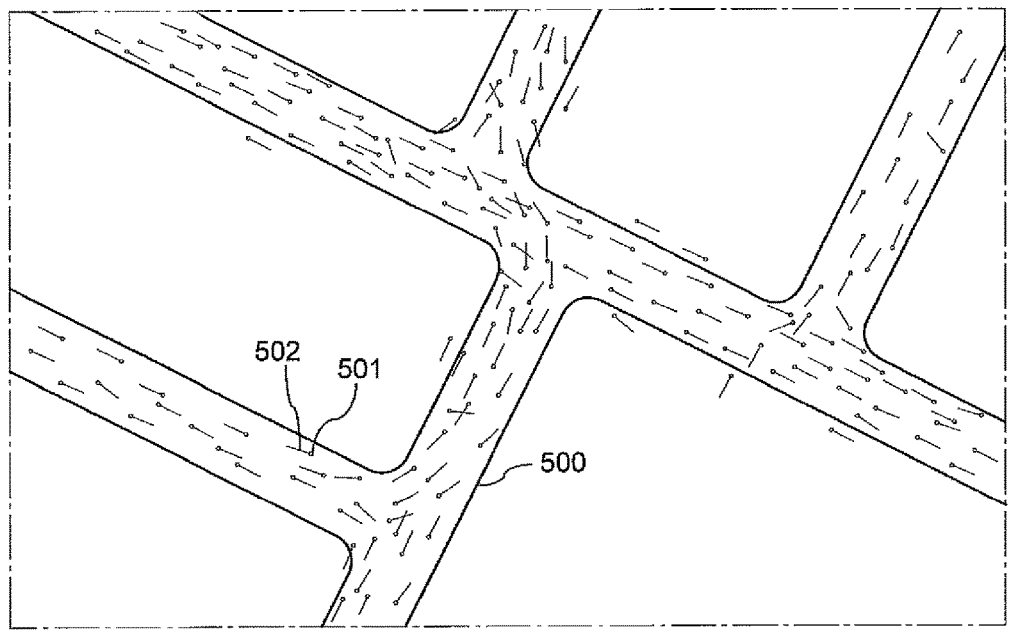
FIG. 5 is a diagram illustrating an example distribution of indicated positions and associated heading vectors.

Example content of the sets of data is visualized in FIG. 5. FIG. 5 presents a network of real roads 500 in a certain geographic area. Positions indicated in a plurality of received sets of data are represented in FIG. 5 with small circles 501. The associated headings indicated in the sets of data are represented with lines 502 extending from a respective circle 501 in direction of the respective heading. It can be seen that the headings may have any orientation on a scale from 0 to 360 degrees. It can further be seen that the headings on a road may be bi-directional, if the mobile devices providing the sets of data moved in opposite directions along the road.

Next, server 300 creates curves representative of a bi-directional road geometry from the received sets of data. (action 402) Before using the received sets of data for creating such curves, the sets of data may be filtered to exclude sets of data indicating a low velocity, for instance a velocity below 5 kilometers per hour. In particular if the mobile devices 310-312 are handheld devices, this may help avoiding the use of data that was captured while users of the mobile devices 310-312 were not moving along the roads.

The curves may be defined for example in a Cartesian coordinate system using X and Y coordinates or in a geographic coordinate system using latitude and longitude coordinates. The curves may be generated in various manners, for instance using K-means trajectory clustering, a kernel density estimation technique or using principal curves. By way of example, it is assumed for the present example, that the curves are created using polylines, which will be described in some more detail in the following.

A virtual grid may be arranged to cover the positions of mobile devices indicated in the received sets of data. For each grid area, a median of the heading vectors associated with the positions in the grid may be determined. This median of headings may be considered a first orientation. Further orientations may be determined for headings deviating from the first orientation e.g. by more than 30°. Other orientations may be handled accordingly. For each grid area, an initial seed point may be determined such that it corresponds to a median of the positions in the considered sets of data. All sets of data are determined which indicate a position lying within a circle of predefined radius around the initial seed point. For these positions, a constrained weighted center of mass may be determined in iterative fashion using a mean shift technique, for which the movements are limited to an orientation perpendicular to the first orientation. Additionally, during the mean shift iterations, we only consider probe points within each search radius that have a heading angle that is within a predefined limit, e.g. ±30°, of the seed point orientation. The mean shift iterations are stopped when the difference between the center of mass of the current iteration and the preceding operation falls short of a predetermined threshold. The determined center of mass becomes the first polyline vertex. The determined center of mass is extended a short distance (typically less than the search radius) in a direction corresponding to the first orientation where it is considered as a new, intermediate seed point, for which the orientation is updated as well using the median heading. The process described for the initial seed point is repeated for the intermediate seed point and subsequent intermediate seed points, starting with the tracing of a circle of predetermined radius. In each repetition, the determined converged center of mass becomes a new intermediate polyline vertex for the polyline in the grid area. To prevent additional polylines from forming next to an existing polyline, all seed points near the polyline are tagged as processed as the polyline grows. The entire process is then repeated starting from the first polyline vertex, but in the opposite direction of the first orientation for creating the curves of the representation of the road geometry for a specific direction of movement on a road.

Figure 6:
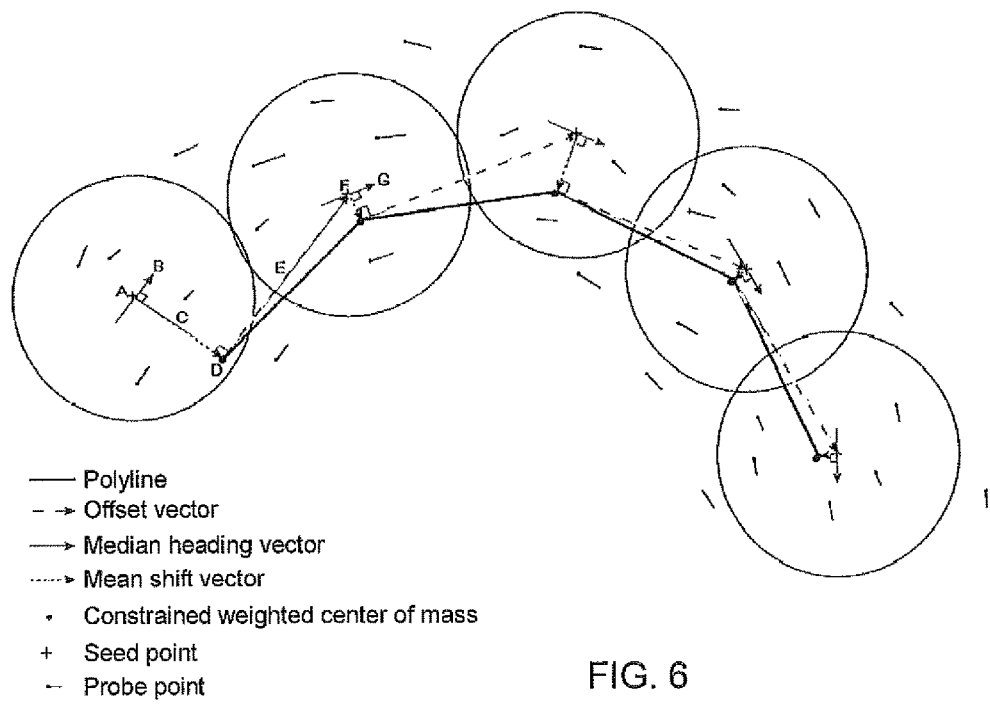
FIG. 6 is a diagram illustrating an example creation of a polyline for a representation of bi-directional road geometry.

FIG. 6 is a diagram schematically illustrating the principle of the creation of a polyline. It shows a plurality of probe positions in the form of dots and the associated heading in the form of connected lines as probe points. The creation of the polyline starts at an initial seed point A with a first orientation indicated by arrow B, and taking account of selected heading compatible probe points within a circle of predetermined radius around seed point A. A constrained mean shift iterates perpendicularly to arrow B following arrow C, until it converges at center of mass D, which becomes the initial polyline vertex. Next, center of mass D is offset a short distance along arrow E. Arrow E is parallel to the initial seed point heading represented by arrow B and perpendicular to the mean shift arrow C. At the destination of the offset, a new intermediate seed point F is created, and its orientation is updated, as indicated by arrow G. The new orientation may correspond to the median heading of all considered headings within a circle of predetermined radius around intermediate seed point F. The process then repeats with the new seed point F, which moves perpendicularly to the new orientation to create the next converged center of mass and thus the next polyline vertex. The process continues until the polyline is considered to have converged at the end of a road, such as in an instance in which there are no more (or some minimum number of) heading compatible probe points to consider within the search radius making it unable to advance further. Next, the polyline restarts at the first vertex D but moves in the opposite direction by using a reversed offset vector E at each step as it advances in the opposite direction. This part of the process is not represented in FIG. 6.

When processing the sets of data with the other orientations than the first orientation accordingly, a double digitized road geometry reflecting bi-directional traffic on the roads may be obtained. Such an approach for creating a representation of a bi-directional road geometry may have the effect that it may provide reliable results as a basis for the creation of a representation of an intersection geometry, even if the received sets of data comprise noisy probe data, for example in the form of positioning errors and/or heading errors, if the probes are sparse or have an uneven density including gaps, or if the data for different roads is overlapping. Furthermore, the approach may support parallel processing and thus a distributed processing of an extensive amount of data. It is to be understood that the determination of seed points and the creation of polylines as curves of the representation of the road geometry may be implemented and refined in many ways.

Figure 7:
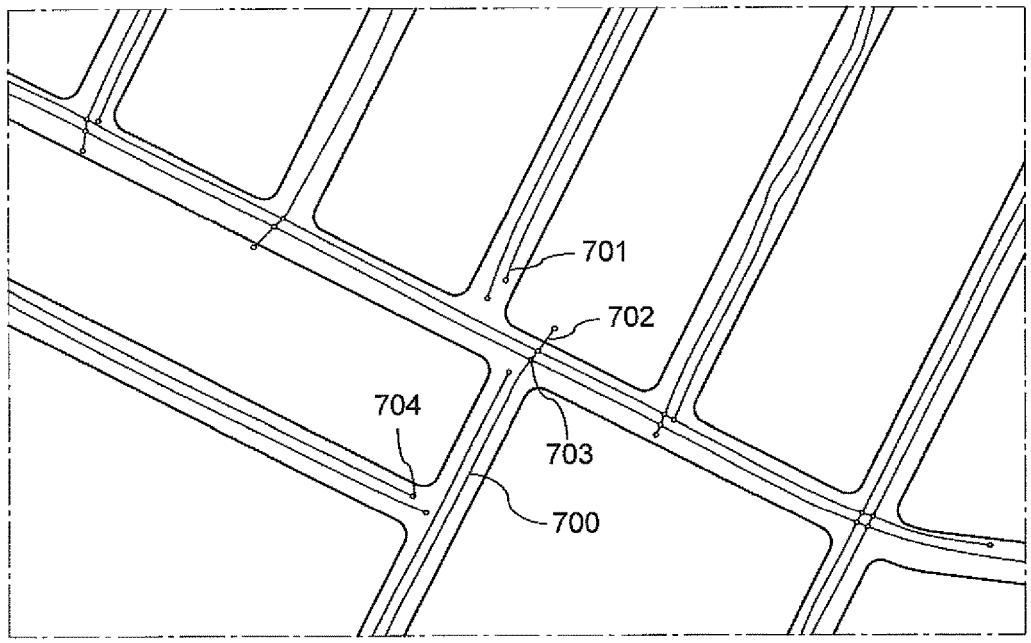
FIG. 7 is a diagram illustrating an example representation of bi-directional road geometry derived from indicated positions and associated heading vectors.

An example of resulting curves is illustrated in FIG. 7 with curves 700. As can be seen, some of the curves 701 may not properly extend to the intersections of the indicated real roads. Other curves 702 may extend too far.

Using the created curves, server 300 may now detect intersections of roads to enable an enhanced modelling of these in the representation of the road geometry.

To this end, server 300 may detect all points of intersection between the created curves as well as all end points of curves. For the location of each detected point of intersection and each detected end point, an intersection node is created. (action 403)

In FIG. 7, example created intersection nodes are illustrated with small circles, an example intersection node corresponding to a point of intersection of curves being provided with reference sign 703, and an example intersection node corresponding to an end point of a curve being provided with reference sign 704.

Based on the defined intersection nodes, server 300 determines intersection centers. To this end, the intersection nodes are clustered as follows:

One of the nodes is selected as belonging to a cluster. Server 300 then searches for surrounding nodes within a predefined intersection search radius around the selected node. The search radius may be set for instance to 30 meters. The found nodes are defined to belong to the same cluster as the selected node. An intersection center is now determined based on all nodes belonging to the cluster. Assuming by way of example the use of a Cartesian coordinate system, X and Y coordinates of the intersection center are computed separately as the median of the X coordinates of the nodes of the cluster and the median of the Y coordinates of the nodes of the cluster, respectively. Since end points of curves are considered as well as intersection nodes, it is possible to catch curves that do not quite extend to an intersection due to sparse data received for the intersection area. All nodes belonging to the cluster are tagged as processed. The clustering is continued with the unprocessed nodes, until all nodes have been processed. (action 404)

Figure 8:
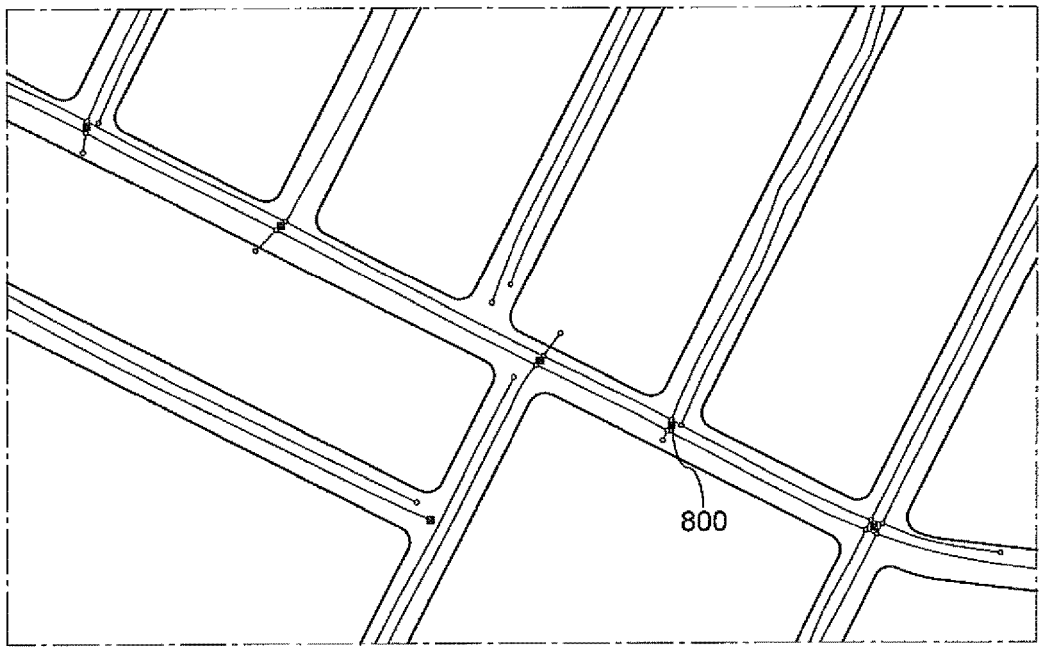
FIG. 8 is a diagram presenting example determined intersection centers of intersections in the representation of bi-directional road geometry of FIG. 7.

FIG. 8 indicates approximate positions of the determined intersection centers in the representation of the road geometry of FIG. 7 with small black squares 800. An intersection center is assumed to correspond to a location lying close to the center of the real road intersection that is to be represented by the representation of the road geometry.

The subsequent actions 405 to 409 are performed separately for each intersection center. The processing may take place subsequently or in parallel.

Server 300 traces an intersection gate detection circle around the intersection center to form intersection entry gates and exit gates. Intersection entry gates and exit gates are given at the locations at which the curves of the representation of the road geometry cross the traced circle. The circle may be of predetermined radius, which may again be, for instance, 30 meters. Each curve is associated with a direction of travel that is derived from the information in the sets of data. A gate is considered an entry gate, in case the curve enters the circle at the point of crossing the circle. A gate is considered an exit gate, in case the curve exits the circle at the point of crossing the circle. (action 405)

It has to be noted that the radius of the circles used in actions 404 and 405 may be set to any other value than 30 meters as well, in particular to any value that is considered to be suitable in the considered geographical region to extend beyond an average intersection, but to be smaller than the distance to neighboring roads and intersections. It is further to be understood that the size of the circles does not have to be set to a fixed value. It may be defined dynamically as well, for instance based on the sets of data and/or forming a graph and analyzing the length of the roads in the area. Furthermore, the intersection search radius and the radius of the intersection gate detection circle do not necessarily have to be set to the same value.

Figure 9:
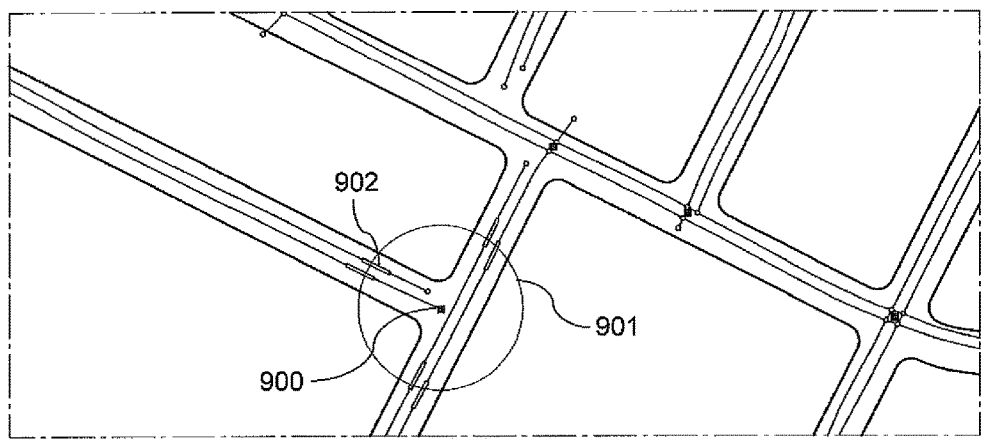
FIG. 9 is a diagram illustrating an example gate detection for a selected one of the intersections of FIG. 8.

FIG. 9 focuses on one of the road intersections of FIG. 8 and presents in addition an example intersection gate detection circle 901 that is traced around an example intersection center 900. The edges of the polylines forming the curves created in action 402 and lying in the area at which the circle 901 crosses the curves have been highlighted by means of elongated rectangles 902.

Server 300 then logically connects each entry gate with each exit gate, excluding those belonging to the same road. (action 406) In the example of the circled intersection in FIG. 9, there are thus 6 logical connections.

Server 300 may now form the geometry shape of the turn maneuvers at the intersection using a Bézier curve.

A Bézier curve is defined by control points $P_1$ of a control polygon.

$$B(t) = \sum_{i=0}^{n} P_i b_{i,n}(t) \text{ with } t \in [0, 1]$$

where $b_{i,n}(t) = \binom{n}{i} t^i (1-t)^{n-1}$ are the Bernstein polynomials.

In the present case, a cubic Bézier curve is used by way of example. A cubic Bézier curve is defined by four control points [$P_0$, $P_1$, $P_2$, $P_3$] of a quadrilateral polygon:

$$B(t) = \sum_{i=0}^{3} P_i b_{i,n}(t) = (1-t)^3 P_0 + 3(1-t)^2 t P_1 + 3(1-t)t^2 P_2 + t^3 P_3,$$

$$t \in [0, 1]$$

Figure 10:
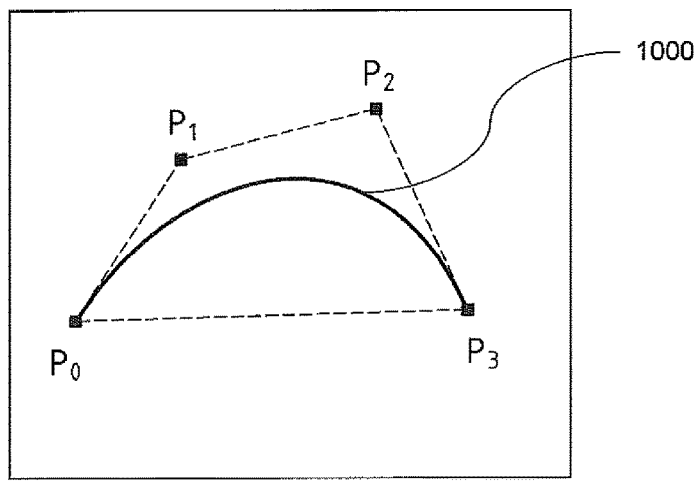
FIG. 10 is a diagram illustrating an example Bézier curve control polygon.

FIG. 10 illustrates a corresponding control polygon with control points $P_0$-$P_3$ for a cubic Bézier curve 1000. The edges [$P_0$,$P_1$] and [$P_2$,$P_3$] of the control polygon [$P_0$, $P_1$, $P_2$, $P_3$] are the tangent to the curves ends of the Bézier curve 1000.

It is to be understood that higher or lower degree Bézier curves may be used as well by modifying the technique for computing the control polygon.

Server 300 now derives a Bézier polygon for each pair of logically connected entry gate and exit gate taking account of the distance between the gates, gate heading vectors and a scaling vector to form a Bézier curve connecting the pair of entry gate and exit gate. (action 407)

Figure 11:
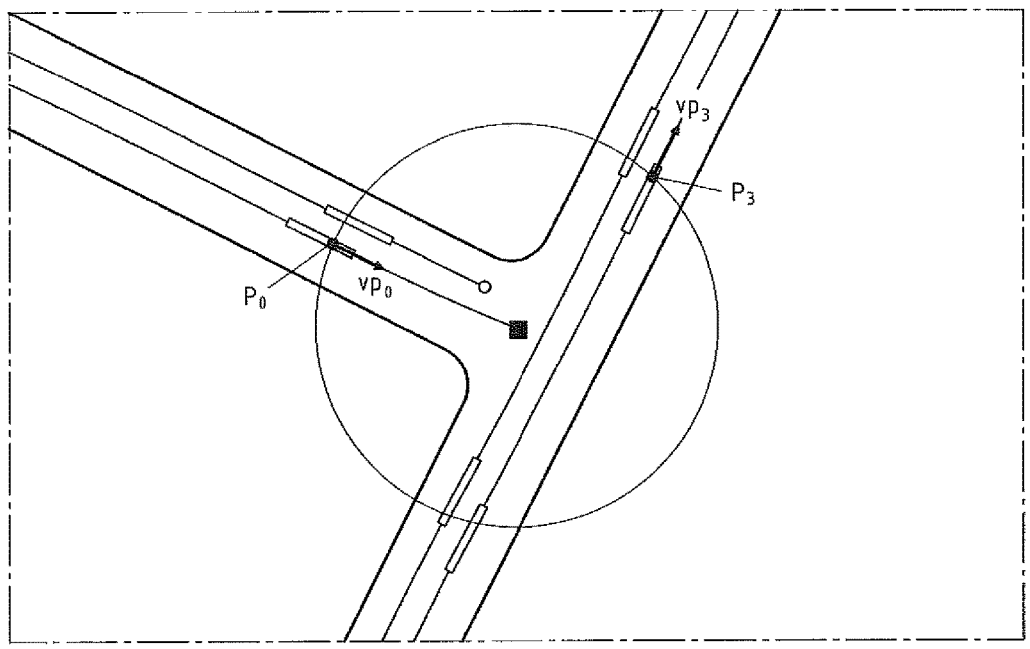
FIG. 11 is a diagram illustrating example gate locations and gate vectors for the selected intersection of FIG. 9.

Still further focusing on the intersection considered in FIG. 9, FIG. 11 illustrates an example pair of an entry and exit gates, for which a Bézier curve may be determined. The entry gate is labeled $P_0$ as it corresponds to the first control point for the Bézier curve, while the exit gate is labeled $P_3$ as it corresponds to the fourth control point for the Bézier curve. Depending on the coordinate system used for the representation of the road geometry, each of the control points $P_0$-$P_3$ may be defined in latitude and longitude values or in X and Y coordinates. In addition, the heading vectors at the gates $P_0$, $P_3$ are indicated as $vp_0$ and $Vp_3$, respectively. The heading vectors $vp_0$, $Vp_3$ indicate the orientation of the curves and thus the direction of travel at the respective gate $P_0$, $P_3$.

The edges [$P_0$,$P_1$] and [$P_2$,$P_3$] of the control polygon [$P_0$, $P_1$, $P_2$, $P_3$] are formed by the gate curve tangents vector points [$vp_0$, $vp_3$], scaled by the distance $d=[P_0,P_3]$. Thus, control points $P_1$ and $P_2$ may be computed as:

$$P_1 = P_0 + \gamma d(vp_0) \text{ and } P_2 = P_3 - \gamma d(vp_3)$$

where γ is a further scaling factor.

The resulting control points $P_0$-$P_3$ yield a representation of an intersection geometry in the form of a Bézier curve specifically adapted to a pair of entry and exit gates of the considered intersection.

The scaling factor γ may be set for instance to a fixed value of 0.5. By increasing the scaling factor γ the Bézier curve will extend further towards the intersection center. Thus, in some embodiments, the scaling factor may also be modified based on the estimated size of the intersection or individually for each pair of roads corresponding to a turn maneuver. The gates may also be moved closer or further away from the estimated intersection center to adjust the shape of the turn maneuver Bézier curves. By considering the overall size and shape of the intersection, individual scaling factors for each pair of roads connecting to the intersection corresponding to a turn maneuver can be computed to optimize the intersection turn maneuver Bézier curve shape.

While the quadrilateral polygon presented in FIG. 10 is convex, the quadrilateral polygon may equally result to be concave or self-intersecting, depending on the relative positions of entry and exit gates. Consequently, suitable Bézier curves may be defined for various intersection constellations.

Figure 12:
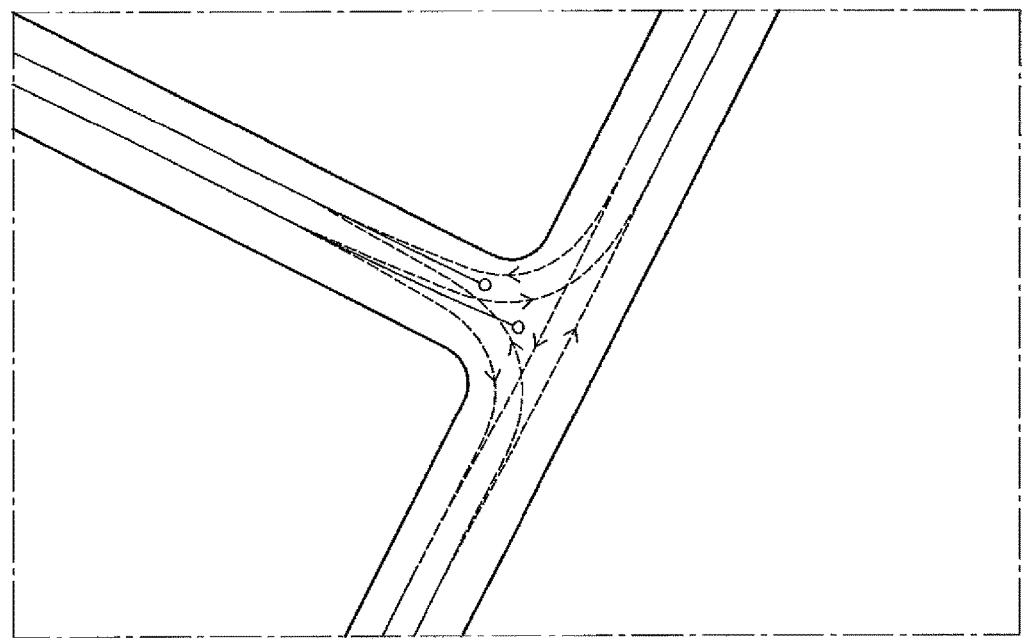
FIG. 12 is a diagram illustrating example Bézier curve turn maneuver curves for the selected intersection of FIG. 9.

FIG. 12 presents the intersection of FIG. 11 with six computed Bézier curves connecting a respective entry gate with a respective exit gate. The Bézier curves are indicated with dashed lines. Arrows indicate the direction of travel from a respective entry gate to a respective exit gate.

Server 300 validates each determined connection by a Bézier curve based on the sets of data received in action 401. (action 408) From the sets of data, those may be selected which indicate a position in the area surrounding the entry gate that was used as a basis of the Bézier curve. Since each set of data comprises a device ID, it is possible to track the movement of all individual mobile devices that provided the selected sets of data simply by connecting a sequence of positions in the sets of data received for the respective mobile device. It is checked whether the resulting trajectory for a mobile device progresses from a geographic location corresponding with a set accuracy to the entry gate to a geographic location corresponding with a set accuracy to the exit gate that was used as a basis of the Bézier curve without detour, as in the case of a U-turn or a going around a block, etc. It is assumed that a trajectory does not include such a detour, in case the trajectory length is proportional to the length of the Bézier curve that has been computed for connecting the entry gate with the exit gate. Server 300 determines the number of such trajectories, which have a trajectory length that is proportional to the length of the Bézier curve that has been computed for connecting the entry gate with the exit gate. If the number exceeds a predetermined threshold value, the Bézier curve is considered valid. For determining suitable trajectories of mobile devices, positions indicated in sets of data may be map matched to the road segments entering the intersection via one of the entry gates and to the road segments exiting the intersection via one of the exit gates. In case that the road segments for the entry gate(s) and/or exit gate(s) are short because the neighboring intersections are close to each other, the search for sets of data indicating suitable positions may be somewhat extended to road segment beyond the two road segments entering/exiting the intersection. The length being required to be proportional relates to the possibility that the length of the trajectories may be determined on a different scale than the length of the Bézier curve. If the scale is the same, the length is simply required to be the same. The length being proportional or the same may be understood to be proportional or the same within predetermined limits, for instance allowing a fixed maximum value of deviation or a fixed maximum percentage of deviation.

The validation allows for instance taking account of the case that an end point of a curve is detected as an intersection node, even though it may correspond to a dead-end road that leads in direction of another road but actually ends before hitting onto the other road.

Each Bézier curve that has been determined to be valid in action 408 is used to replace sections of the original curves between the corresponding entry and exit gates. (action 409) Since Bézier curves are suited to provide smooth turn maneuver curves, they may have a better shape and thus, if valid, a higher fidelity than any turn maneuver curve that is derived from measurement data, as the latter is deteriorated by measurement errors and depends on the density of available data.

For the case that one or more original curves in the area of intersections are not replaced, crossing curves may be converted into a navigable path. This conversion may take place for instance for all crossings in the scope of action 403, or it may take place any time after action 408 only for those curves that have not been truncated and replaced, since the corresponding Bézier curve was considered not to be valid in action 408.

Figure 13:
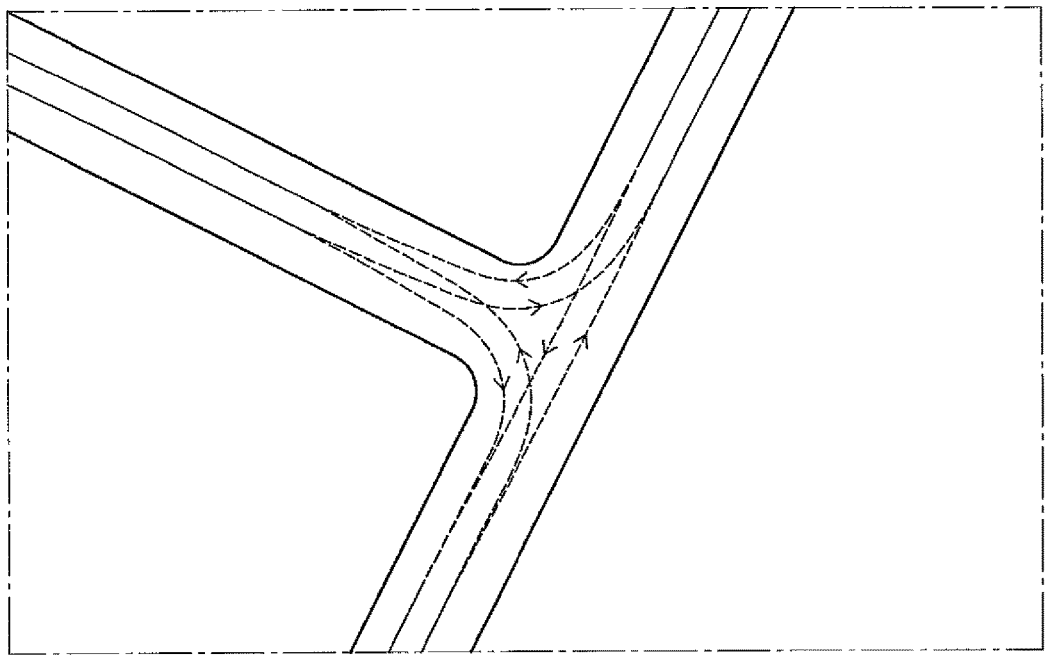
FIG. 13 is a diagram illustrating an example replacement of original curves by Bézier curves for the selected intersection of FIG. 9.

FIG. 13 is a diagram illustrating a corresponding refined representation of an intersection geometry. When comparing the diagram of FIG. 13 with the diagram of FIG. 12, it can be seen that the original curves inside the circle of FIG. 11 have been truncated and replaced with the computed Bézier curves.

Figure 14:
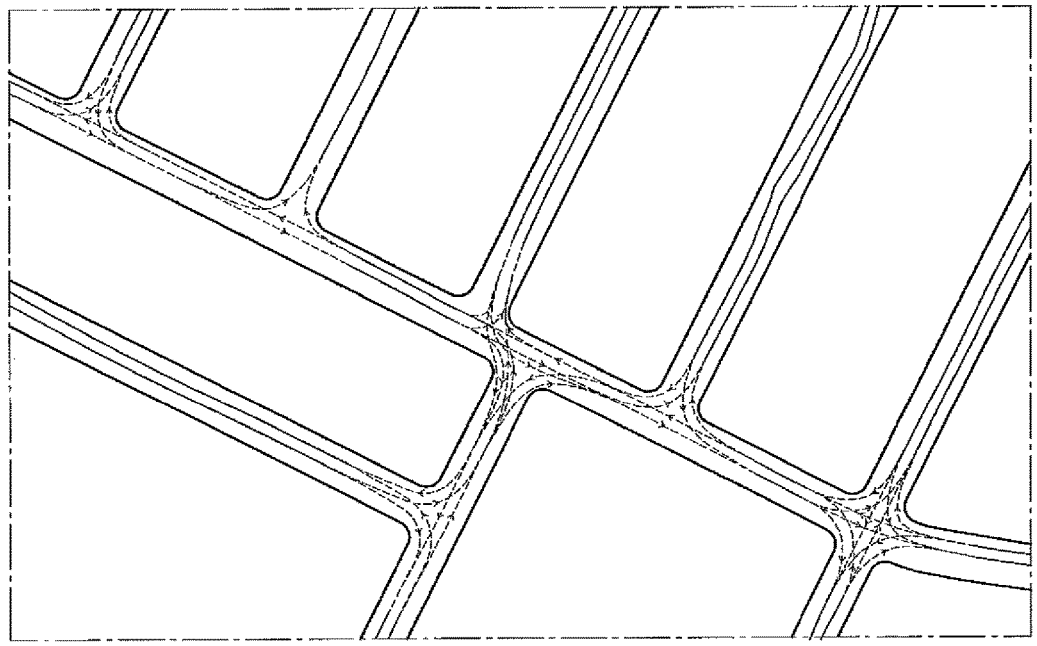
FIG. 14 is a diagram illustrating an example refined representation of bi-directional road geometry that is based on the original representation of bi-directional road geometry of FIG. 7.

FIG. 14 is a diagram illustrating a refined representation of the road geometry of FIG. 7, in which curve sections have been replaced by computed Bézier curves for all presented intersections in line with actions 405 to 409.

Finally, server 300 may provide the refined representation of the entire road geometry for mapping, navigation or change detection computations. (action 410) The data may be provided for use by another server 320 or by mobile devices. Alternatively, the data may be provided for use by an internal application of server 300. In this case, results of the computations may be provided for instance to another server 320 or to mobile devices.

It is to be understood that the presented example operations may be varied in many ways. For instance, the order of actions could be modified, actions could be added or omitted and actions could be modified.

FIGS. 2 and 4 may also be understood to represent example functional blocks of a computer program code for supporting a creation of a representation of road geometry.

Summarized, certain embodiments of the invention allow automatically creating high fidelity intersection turn maneuver road geometry from probe data using Bézier curves. Certain embodiments of the invention may be capable of creating a representation of realistic turn maneuver geometry, even when the available data is sparse and/or noisy. They may also be suited to repair defects such as gaps, incorrect connections and/or a poor geometry shapes in original double-digitized road geometry that is obtained from probe data.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that requires software or firmware for operation, even if the software or firmware is not physically present.

This definition of circuitry applies to all uses of this term in this application, including in any claims. As a further example, as used in this application, the term circuitry also covers an implementation of merely a processor (or multiple processors) or portion of a processor and its (or their) accompanying software and/or firmware. The term circuitry also covers, for example and if applicable to the particular claim element, a baseband integrated circuit or applications processor integrated circuit for a mobile phone or a similar integrated circuit in server, a cellular network device, or other network device.

Any of the processors mentioned in this text could be a processor of any suitable type. Any processor and memory may comprise but is not limited to one or more single-core processor(s), one or more dual-core processor(s), one or more multi-core processor(s), one or more microprocessor(s), one or more digital signal processor(s), one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory, a random access memory, a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The functions illustrated by processor 101 in combination with memory 102, or by processor 301 in combination with memory 302 or by the component 303 can be viewed as means for creating a representation of a road geometry from a plurality of sets of data, each set of data including at least an indication of a position and an indication of a heading of a mobile object; means for detecting an intersection in the representation of the road geometry; means for defining at least one Bézier curve representing a trajectory between an entry to and an exit from the intersection; and means for replacing at least a part of the created representation of the road geometry for the intersection by the at least one defined Bézier curve.

The program codes in memory 102 or memory 302 can also be viewed as comprising such means in the form of functional modules.

It will be understood that all presented embodiments are only exemplary, that features of these embodiments may be omitted or replaced and that other features may be added. Any mentioned element and any mentioned method step can be used in any combination with all other mentioned elements and all other mentioned method step, respectively. It is the intention, therefore, to be limited only as indicated by the scope of the claims appended hereto.

What is claimed is:

1. A method performed by at least one apparatus comprising:

creating and storing a representation of a bi-directional road geometry including separate curves for opposite directions of travel for at least some roads from a plurality of sets of data, each set of data including at least an indication of a position and an indication of a heading of a mobile object;

detecting an intersection in the representation of the road geometry by detecting intersections of curves and detecting end points of curves, creating an intersection node for each detected intersection of curves and each detected end point of a curve, clustering the intersection nodes to obtain at least one cluster of intersection nodes, and determining an intersection center for each cluster of intersection nodes;

defining at least one Bézier curve representing a trajectory between an entry to and an exit from the intersection by tracing a circle around a respective determined intersection center, wherein crossing points between curves of the bi-directional road geometry and the circle form at least one intersection entry gate as at least one entry to the intersection and at least one intersection exit gate as at least one exit from the intersection, and defining at least one Bézier curve connecting at least one possible pair of entry gate and exit gate;

replacing at least a part of the created representation of the road geometry for the intersection by the at least one defined Bézier curve creating a revised representation by truncating, inside the circle, a curve of the representation of the bi-directional road geometry connected to the entry gate and a curve of the representation of the bi-directional road geometry connected to the exit gate of the at least one pair of entry gate and exit gate and adding the Bézier curve to the representation of the bi-directional road geometry;

storing the revised representation; and providing the revised representation for at least one of mapping or navigation.

2. The method according to claim 1, further comprising providing a representation of the road geometry including the at least one Bézier curve for road geometry based computations.

3. The method according to claim 1, wherein clustering intersection nodes comprises:

a) selecting an intersection node that has not been tagged as processed and tagging the intersection node as processed;

b) searching for surrounding nodes that have not been tagged as processed within a search radius, tagging all found intersection nodes as processed and considering the selected intersection node and the found intersection nodes as belonging to a cluster; and c) continuing with action a) for further clusters until all intersection nodes have been tagged as processed.

4. The method according to claim 1, wherein each of the at least one Bézier curve is defined by means of a cubic control polygon with:

a first edge extending between an intersection entry gate and an intersection exit gate;

a second edge having a start point at the intersection entry gate and extending to an end point with an orientation corresponding to a direction of travel of a curve entering the circle at the intersection entry gate;

a fourth edge having an end point at the intersection exit gate and reaching the end point from a start point with an orientation corresponding to a direction of travel of a curve exiting the circle at the intersection exit gate;

a length of the second edge and a length of the fourth edge being scaled with a length of the first edge and a scaling factor; and a third edge extending between the end point of the second edge and the start point of the fourth edge.

5. The method according to claim 1, further comprising validating a defined Bézier curve based on the received sets of data.

6. The method according to claim 1, further comprising validating a defined Bézier curve based on the received sets of data, wherein validating a Bézier curve, which is defined to connect an intersection entry gate and an intersection exit gate, comprises:

determining a number of trajectories of mobile objects running from a geographic location corresponding to the intersection entry gate to a geographic location corresponding to the location of the intersection exit gate based on the received sets of data, with the length of the trajectories being proportional, within predetermined limits, to a length of the Bézier curve;

comparing the number with a predetermined threshold value; and if the number exceeds the predetermined threshold value, determining the Bézier curve to be valid.

7. The method according to claim 1, further comprising validating a defined Bézier curve based on the received sets of data, wherein a part of at least one curve between an intersection entry gate and an intersection exit gate within the circle is truncated and a Bézier curve is added only, if the Bézier curve is determined to be valid.

8. An apparatus comprising at least one processor and at least one memory including computer program code, the at least one memory and the computer program code configured to, with the at least one processor, cause the apparatus at least to perform:

create and store a representation of a bi-directional road geometry including separate curves for opposite directions of travel for at least some roads from a plurality of sets of data, each set of data including at least an indication of a position and an indication of a heading of a mobile object;

detect an intersection in the representation of the road geometry by detecting intersections of curves and detecting end points of curves, creating an intersection node for each detected intersection of curves and each detected end point of a curve, clustering the intersection nodes to obtain at least one cluster of intersection nodes, and determining an intersection center for each cluster of intersection nodes;

define at least one Bézier curve representing a trajectory between an entry to and an exit from the intersection by tracing a circle around a respective determined intersection center, wherein crossing points between curves of the bi-directional road geometry and the circle form at least one intersection entry gate as at least one entry to the intersection and at least one intersection exit gate as at least one exit from the intersection, and defining at least one Bézier curve connecting at least one possible pair of entry gate and exit gate;

replace at least a part of the created representation of the road geometry for the intersection by the at least one defined Bézier curve creating a revised representation by truncating, inside the circle, a curve of the representation of the bi-directional road geometry connected to the entry gate and a curve of the representation of the bi-directional road geometry connected to the exit gate of the at least one pair of entry gate and exit gate and adding the Bézier curve to the representation of the bi-directional road geometry;

store the revised representation; and provide the revised representation for at least one of mapping or navigation.

9. The apparatus according to claim 8, wherein the at least one memory and the computer program code are further configured to, with the at least one processor, further cause the apparatus to:

provide a representation of the road geometry including the at least one Bézier curve for road geometry based computations.

10. The apparatus according to claim 8, wherein clustering intersection nodes comprises:

a) selecting an intersection node that has not been tagged as processed and tagging the intersection node as processed;

b) searching for surrounding nodes that have not been tagged as processed within a search radius, tagging all found intersection nodes as processed and considering the selected intersection node and the found intersection nodes as belonging to a cluster; and c) continuing with action a) for further clusters until all intersection nodes have been tagged as processed.

11. The apparatus according to claim 8, wherein each of the at least one Bézier curve is defined by means of a cubic control polygon with:

a first edge extending between an intersection entry gate and an intersection exit gate;

a second edge having a start point at the intersection entry gate and extending to an end point with an orientation corresponding to a direction of travel of a curve entering the circle at the intersection entry gate;

a fourth edge having an end point at the intersection exit gate and reaching the end point from a start point with an orientation corresponding to a direction of travel of a curve exiting the circle at the intersection exit gate;

a length of the second edge and a length of the fourth edge being scaled with a length of the first edge and a scaling factor; and a third edge extending between the end point of the second edge and the start point of the fourth edge.

12. The apparatus according to claim 8, wherein the at least one memory and the computer program code are further configured to, with the at least one processor, further cause the apparatus to:

validate a defined Bézier curve based on the received sets of data.

13. The apparatus according to claim 8, wherein the at least one memory and the computer program code are further configured to, with the at least one processor, further cause the apparatus to validate a defined Bézier curve based on the received sets of data, wherein validating a Bézier curve, which is defined to connect an intersection entry gate and an intersection exit gate, comprises:

determining a number of trajectories of mobile objects running from a geographic location corresponding to the intersection entry gate to a geographic location corresponding to the location of the intersection exit gate based on the received sets of data, with the length of the trajectories being proportional, within predetermined limits, to a length of the Bézier curve;

comparing the number with a predetermined threshold value; and if the number exceeds the predetermined threshold value, determining the Bézier curve to be valid.

14. The apparatus according to claim 8, wherein the at least one memory and the computer program code are further configured to, with the at least one processor, further cause the apparatus to validate a defined Bézier curve based on the received sets of data, and wherein a part of at least one curve between an intersection entry gate and an intersection exit gate within the circle is truncated and a Bézier curve is added only, if the Bézier curve is determined to be valid.

15. The apparatus according to claim 8, wherein the apparatus is one of:

a server;

a stationary device;

a module for a device.

16. A system comprising at least one processor and at least one memory including computer program code, the at least one memory and the computer program code configured to, with the at least one processor, cause the system at least to perform:

create and store a representation of a bi-directional road geometry including separate curves for opposite directions of travel for at least some roads from a plurality of sets of data, each set of data including at least an indication of a position and an indication of a heading of a mobile object;

detect an intersection in the representation of the road geometry by detecting intersections of curves and detecting end points of curves, creating an intersection node for each detected intersection of curves and each detected end point of a curve, clustering the intersection nodes to obtain at least one cluster of intersection nodes, and determining an intersection center for each cluster of intersection nodes;

define at least one Bézier curve representing a trajectory between an entry to and an exit from the intersection by tracing a circle around a respective determined intersection center, wherein crossing points between curves of the bi-directional road geometry and the circle form at least one intersection entry gate as at least one entry to the intersection and at least one intersection exit gate as at least one exit from the intersection, and defining at least one Bézier curve connecting at least one possible pair of entry gate and exit gate;

replace at least a part of the created representation of the road geometry for the intersection by the at least one defined Bézier curve creating a revised representation by truncating, inside the circle, a curve of the representation of the bi-directional road geometry connected to the entry gate and a curve of the representation of the bi-directional road geometry connected to the exit gate of the at least one pair of entry gate and exit gate and adding the Bézier curve to the representation of the bi-directional road geometry;

store the revised representation; and provide the revised representation for at least one of mapping or navigation.

17. A non-transitory computer readable storage medium in which computer program code is stored, the computer program code when executed by a processor causing at least one apparatus to perform the following:

create and store a representation of a bi-directional road geometry including separate curves for opposite directions of travel for at least some roads from a plurality of sets of data, each set of data including at least an indication of a position and an indication of a heading of a mobile object;

detect an intersection in the representation of the road geometry by detecting intersections of curves and detecting end points of curves, creating an intersection node for each detected intersection of curves and each detected end point of a curve, clustering the intersection nodes to obtain at least one cluster of intersection nodes, and determining an intersection center for each cluster of intersection nodes;

define at least one Bézier curve representing a trajectory between an entry to and an exit from the intersection by tracing a circle around a respective determined intersection center, wherein crossing points between curves of the bi-directional road geometry and the circle form at least one intersection entry gate as at least one entry to the intersection and at least one intersection exit gate as at least one exit from the intersection, and defining at least one Bézier curve connecting at least one possible pair of entry gate and exit gate;

replace at least a part of the created representation of the road geometry for the intersection by the at least one defined Bézier curve creating a revised representation by truncating, inside the circle, a curve of the representation of the bi-directional road geometry connected to the entry gate and a curve of the representation of the bi-directional road geometry connected to the exit gate of the at least one pair of entry gate and exit gate and adding the Bézier curve to the representation of the bi-directional road geometry;

store the revised representation; and provide the revised representation for at least one of mapping or navigation.

* * * * *